United States Patent Office 3,573,941
Patented Apr. 6, 1971

3,573,941
EXPANDED MAGNESIA CEMENT
John Lee Edwards, Great Bookham, and James Macoustra, Sutton, England, assignors to BP Chemicals (U.K.) Limited, London, England
No Drawing. Filed Feb. 26, 1968, Ser. No. 707,941
Claims priority, application Great Britain, Mar. 30, 1967, 14,449/67
Int. Cl. C04b 9/14, 21/02
U.S. Cl. 106—88                                  8 Claims

ABSTRACT OF THE DISCLOSURE

An expanded magnesia cement containing a volume of gas at least equal to the volume of the cement in its unexpanded state. The cement is formed by mixing magnesium oxide, magnesium chloride and water in the presence of a foam-forming surface active agent and in the presence of a foam stabilizing water-soluble silicone, entraining a gas into the resulting mix to form a flowable foam and allowing the foam to set. Particularly useful cement from an economic and structural point of view have three to twelve times the volume of gas present. A method for the production of these expanded cements is also claimed.

---

This invention relates to expanded magnesia cement and to a method for its production.

Magnesia cement is essentially hydrated magnesium oxychloride and is formed from a mixture of magnesium chloride, magnesium oxide and water. It has been used in many applications, for example as a flooring material.

The present invention provides expanded magnesia cement which contains distributed throughout its set state a volume of gas at least equal to the volume of the cement and preferably at least equal to three times the volume of the cement. Expanded magnesia cement of the present invention is most useful from an economic and structural point of view when the amount of gas present in the cement is in the range three to twelve times the volume of the cement. The gas present is normally air but could be any other readily available gas, e.g. carbon dioxide and nitrogen.

When for example the cement contains four times its volume of air the volume of the expanded cement will be five times the original value and thus the density of the expanded cement will be one fifth of the density of the unexpanded cement. The cement is therefore useful as a light-weight building material and it is particularly useful in sheet form as the middle portion of sandwich-type wall cladding or wall partitioning.

The expanded magnesia cement according to the present invention may also contain inert fillers, for example perlite, vermiculite, pulverised fuel ash, silica, asbestos, glass fibre and other similar inert fillers. The inert filler may be present in an amount ranging from 1 to 15% by weight of the cement. The magnesia cement filled with asbestos is particularly useful in that the compressive strength of the cement is greatly improved.

According to an aspect of the present invention, the expanded magnesia cement may be a process which comprises mixing magnesium oxide, magnesium chloride, and water in the presence of a foam producing surface active agent and water-soluble silicone. Air or other gas is entrained in the mixture to form a flowable foam and the foam is allowed to set.

The gas entrained in the cement is usually air and for the sake of convenience hereinafter air will be referred to as the entrained gas.

The magnesium chloride is preferably in the form of an approximately saturated solution in water and this water is usually sufficient for the production of a flowable foam.

The magnesium oxide may be of the type commercially used in the production of magnesia cement and is usually referred to as "heavy magnesium oxide" which is obtained by the calcination of magnesite (magnesium carbonate).

The setting of the magnesia cement is an exothermic chemical reaction and generally takes place between twenty and ninety minutes after the mixing step. In order to obtain magnesia cements having good compressive strength the flowable foam should be in a flowable state for at least 30 minutes, preferably at least 40 minutes, after the mixing step. One way of achieving this is to select a slow-reacting grade of magnesium oxide, e.g. the commercially available "low reactivity magnesias."

The surface active agent may be any material which assists the production of a foam. It may be of the aromatic sulphonate type, for example an alkylbenzene sulphonate, particular examples of which are dodecyl benzene sodium sulphonate commercially available as Nansa HS80 (Marchon Products) and sodium alkylnaphthalene sulphonate commercially available as Aphrosol FC (I.C.I.); or the surface active agent may be an alkylphenol/ethylene oxide condensate, for example a nonylphenol/ethylene oxide condensate in which the average number of ethylene oxide units per phenol unit is about 9, a particular example of which is Empilan MP9 (Marchon Products).

The surface active agent may be present in the range 0.001 to 5% by weight of the cement, but it is preferably present in the range of 0.005 to 0.1% by weight of the cement.

The water-soluble silicone is added to the mix in order to stabilise the resulting foam and a convenient silicone is an ethylene glycol/siloxane block polymer commercially available from Midland Silicones Ltd. as CGA1. A small proportion of the silicone compound is all that is necessary and an amount in the range of 0.001 to 0.5% based on the weight of the cement is generally sufficient.

Air may be entrained into the mixture by any convenient means, for example by blowing air into the stirred mixture or by high speed mixing of the mixture wherein air is entrained by virtue of the rapid mixing. The preferred apparatus for entraining air is one which comprises a bowl, the bottom of which is provided with a port or ports for passing air under pressure into the bowl and a mixing element which causes the mixture present in the bowl to swirl around as the air is passed in. An example of such an apparatus is the Hobart Planetary mixer which is an apparatus commonly used in bakeries for the production of synthetic cream. Air fed to the bowl under a pressure of approximately 5 p.s.i. is usually found to give effective results in the process of the present invention.

If desired a thickening agent, for example sodium alginate or methyl cellulose may be added to the mix in order to facilitate air entrainment.

The expanded magnesia cement of and produced by the present invention has considerable advantages over conventional magnesia cement in that it is cheaper and substantially lighter. It is an ideal material for use in buildings, particularly internal building blocks and cores for sandwich panels used for wall cladding and partitioning. Since expanded magnesia cement is completely fireproof it is a very attractive material for use in building applications.

The invention will be further illustrated by reference to the following examples in which parts by weight.

EXAMPLE I 100 parts of heavy magnesium oxide (first setting time of 5 hours according to British Standard 776:1963) and 100 parts of magnesium chloride solution obtained by dissolving 60 parts of magnesium chloride hexahydrate in 40 parts water were added to a Hobart planetary mixer together with 1 part of Nansa HS80 (dodecyl benzene sodium sulphonate) and 0.5 part of CGA1 (silicone fluid comprising ethylene glycol/siloxane block polymers). Air was supplied to the bowl of the planetary mixer at a pressure of about 5 p.s.i. Mixing was carried out for 10–20 minutes by which time the mixture had entrained therein a large volume of air and was in a flowable plastic state.

The plastic mass was poured into two moulds, one the shape of a cube 6" x 6" and the other in the form of a sheet 1" thick. They were allowed to set and the set cement had excellent structural strength. Both forms were expanded to five or six times the volume of the unexpanded cement and had as a consequence a density six or seven times less than unexpanded magnesia cement.

EXAMPLE II

Four samples of foamed magnesia cement prepared according to the directions given in Example I were set into 4 inch cubes and their compressive strength measured. The density of the cubes and their respective compressive strengths are given in the following table.

| Sample | Density [1] | Compressive strength [2] |
|---|---|---|
| 1 | 20 | 350 |
| 2 | 20 | 350 |
| 3 | 21 | 350 |
| 4 | 20 | 300 |

[1] Pounds per cubic foot.
[2] Pounds per square inch.

EXAMPLE III

Four samples of foamed magnesia cement were prepared according to the directions given in Example I but in addition 5% by weight of asbestos fibre was also included in the mixture for each sample. The samples were allowed to set into 4" cubes and their compressive strengths measured. The results are given in the table below:

| Sample | Density [1] | Compressive strength [2] |
|---|---|---|
| 1 | 47 | 3,500 |
| 2 | 47 | 5,000 |
| 3 | 47 | 3,500 |
| 4 | 49 | 3,500 |

[1] Pounds per cubic foot.
[2] Pounds per square inch.

We claim:

1. A method for the production of an expanded magnesia cement which comprises mixing magnesium oxide, magnesium chloride and water in the presence of from 0.001 to 5% by weight of the cement of a foam-forming surface active agent and in the presence of from 0.0001 to 0.5% based on the weight of the cement of a foam-forming water-soluble silicone, entraining a volume of gas at least equal to the volume of cement in its unexpanded state into the resulting mix to form a flowable foam, and allowing the foam to set into an expanded magnesia cement.

2. A method according to claim 1 wherein the foam is in a flowable state for at least 30 minutes after the mixing step.

3. A method according to claim 1 wherein the water-soluble silicone is an ethylene glycol/siloxane block polymer.

4. A method according to claim 1 wherein the gas is entrained by stirring the mix and blowing the gas into the stirred mixture.

5. An expanded magnesia cement which contains distributed throughout its set state a volume of gas at least equal to the volume of the cement in its unexpanded state formed by mixing magnesium oxide, magnesium chloride and water in the presence of from 0.001 to 0.5% based on weight of the cement of a foam-forming surface active agent and in the presence of from 0.0001 to 5% by weight of the cement of a foam stabilizing water-soluble silicone, entraining a gas into the resulting mix to form a flowable foam, and allowing the foam to set into an expanded magnesia cement.

6. An expanded magnesia cement according to claim 5 wherein the volume of gas is at least equal to three times the volume of the cement in its unexpanded state.

7. An expanded magnesia cement according to claim 5 which contains an inlet filler.

8. An expanded magnesia cement according to claim 7 wherein the inert filler is asbestos fiber.

References Cited

UNITED STATES PATENTS

| | | | |
|---|---|---|---|
| 3,468,684 | 9/1969 | Proell | 106—107 |
| 3,318,839 | 5/1967 | Weissbach | 106—90 |
| 3,147,128 | 9/1964 | Harrell | 106—105 |
| 3,138,472 | 6/1964 | Sommer | 106—106 |
| 3,086,953 | 4/1963 | Nitzsche et al. | 106—90 |
| 2,702,753 | 2/1955 | Dickey | 106—106 |
| 2,598,981 | 6/1952 | Denning | 106—107 |
| 2,413,958 | 1/1947 | Dinkfeld et al. | 106—85 |
| 2,204,581 | 6/1940 | Denning | 106—105 |
| 2,172,861 | 9/1939 | Williams | 106—85 |
| 3,299,112 | 1/1967 | Bailey | 260—448.2 |

OTHER REFERENCES

Tea & Desch, "The Chemistry of Cement and Concrete," Edw. Arnold & Sons, pp. 19, 506-8, 513-15 (1956).

TOBIAS E. LEVOW, Primary Examiner

W. T. SCOTT, Assistant Examiner

U.S. Cl. X.R.

106—86, 90, 106, 107; 252—307